(12) United States Patent
Huang et al.

(10) Patent No.: US 12,439,486 B2
(45) Date of Patent: Oct. 7, 2025

(54) ACCURATE MICROWAVE HEATING METHOD AND DEVICE BASED ON TIME REVERSAL CALIBRATION TECHNOLOGY

(71) Applicant: Sichuan University, Sichuan (CN)

(72) Inventors: Kama Huang, Sichuan (CN); Yi Zhang, Sichuan (CN)

(73) Assignee: Sichuan University, Sichuan (CN)

( * ) Notice: Subject to any disclaimer, the term of this patent is extended or adjusted under 35 U.S.C. 154(b) by 944 days.

(21) Appl. No.: 17/531,339

(22) Filed: Nov. 19, 2021

(65) Prior Publication Data

US 2022/0078891 A1    Mar. 10, 2022

(30) Foreign Application Priority Data

Jun. 29, 2021   (CN) .......................... 202110727078.3

(51) Int. Cl.
*H05B 6/64*   (2006.01)
*H05B 6/68*   (2006.01)
*H05B 6/72*   (2006.01)

(52) U.S. Cl.
CPC .............. *H05B 6/645* (2013.01); *H05B 6/68* (2013.01); *H05B 6/72* (2013.01)

(58) Field of Classification Search
CPC . H05B 6/645; H05B 6/68; H05B 6/70; H05B 6/72

USPC .......................................................... 219/710
See application file for complete search history.

(56) References Cited

U.S. PATENT DOCUMENTS 10,826,335 B2 *  11/2020  Cheatham, III ..... H04W 64/003
11,382,186 B2 *   7/2022  Höynälä ............... G01J 3/0264

* cited by examiner

*Primary Examiner* — Chris Q Liu
*Assistant Examiner* — James F Sims, III

(57) ABSTRACT

The accurate microwave heating method and device based on the time reversal calibration technology are provided. The heating method is applied in the heating device having a signal generator and multiple microwave transceivers, including steps of: placing a material to be heated into the heating device, wherein the signal generator is arranged at a placement position of the material to be heated; according to the placement position of the material to be heated in the heating device, controlling the signal generator to emit a beacon microwave signal; controlling the microwave transceivers to emit microwave power signals according to the received beacon microwave signal; during heating, when a preset trigger condition is detected to be triggered and a current temperature of the material to be heated does not meet a preset temperature, repeating emitting the first and microwave power signals until meeting the preset temperature, and then stopping working.

5 Claims, 4 Drawing Sheets

ACCURATE MICROWAVE HEATING METHOD AND DEVICE BASED ON TIME REVERSAL CALIBRATION TECHNOLOGY

CROSS REFERENCE OF RELATED APPLICATION

The application claims priority under 35 U.S.C. 119(a-d) to CN 202110727078.3, filed Jun. 29, 2021.

BACKGROUND OF THE PRESENT INVENTION

Field of Invention

The present invention relates to a technical field of microwave heating, and more particularly to accurate microwave heating method and device based on a time reversal calibration technology.

Description of Related Arts

The microwave heating process is a process that a heated material placed in a high-frequency electromagnetic field absorbs microwave energy and converts into thermal energy. Compared with the conventional heating method, the microwave heating method has the advantages of high efficiency, energy conservation, selective heating, cleanness and no pollution. With the continuous development of the science and technology, the microwave energy as one highly-efficient clean energy has been more and more widely used in the fields such as food processing, chemical engineering and medicine.

However, because the heating cavity of microwave heating is generally a finite enclosed space and the microwave has multiple distribution modes in the finite space, the energy cannot be effectively focused on the heated material, causing the unsatisfactory microwave heating efficiency and energy utilization rate. More seriously, in some chemical engineering fields, the abnormal phenomena such as sparking and melting of parts even occur. Thus, it is urgent to develop an accurate heating technology, which is able to effectively improve the microwave heating efficiency and the energy utilization rate, for the whole field.

SUMMARY OF THE PRESENT INVENTION

Based on the above problems, the present invention provides accurate microwave heating method and device based on a time reversal calibration technology, aiming at providing a microwave heating way with higher heating efficiency and energy utilization rate.

A first object of the present invention is to provide an accurate microwave heating method based on a time reversal calibration technology, which is applied in a heating device having a signal generator and multiple microwave transceivers, wherein the accurate microwave heating method comprises steps of:

(S11) placing a material to be heated into the heating device, wherein the signal generator is arranged at a placement position of the material to be heated;

(S12) according to the placement position of the material to be heated in the heating device, controlling the signal generator to emit a beacon microwave signal;

(S13) receiving the beacon microwave signal by the microwave transceivers, and controlling the microwave transceivers to emit microwave power signals according to the received beacon microwave signal, wherein the microwave power signals are focused on the placement position for heating the material to be heated in the heating device;

(S14) during heating the material, detecting whether a preset trigger condition is satisfied; and (S15) when the preset trigger condition is detected to be triggered and a current temperature of the material to be heated does not meet a preset temperature, returning back to the step (S12), and repeating the steps (S12)-(S14) until the current temperature of the material to be heated meets the preset temperature; and then stopping the signal generator and the microwave transceivers.

Preferably, the step (S13) specifically comprises steps of:

(S131) according to a phase of the received beacon microwave signal and an initial phase of the beacon microwave signal, determining a first phase of a microwave signal to be emitted;

(S132) according to an amplitude of the received beacon microwave signal and an initial amplitude of the beacon microwave signal, determining a first amplitude of the microwave signal to be emitted; and (S133) according to the first phase and the first amplitude, controlling the microwave transceivers to emit the microwave power signals, wherein the microwave power signals are focused on the placement position for heating the material to be heated in the heating device.

Preferably, before the step (S13), the accurate microwave heating method further comprises a step of:

(S130) after the beacon microwave signal is received by the microwave transceivers, controlling the signal generator to stop emitting the beacon microwave signal.

Preferably, during heating the material to be heated, the preset trigger condition is determined to be satisfied when:

a heating time of the microwave power signals on the material to be heated reaches a time step; or a temperature rise of the material to be heated is detected to reach a temperature interval.

Preferably, after the preset trigger condition is detected to be satisfied, the step (S14) further comprises a step of:

(S140) controlling the microwave transceivers to stop emitting the microwave power signals.

Preferably, the step of "controlling the microwave transceivers to emit microwave power signals according to the received beacon microwave signal" specifically comprises steps of:

controlling at least one of the multiple preset microwave transceivers to emit the microwave power signals according to the received beacon microwave signal.

A second object of the present invention is to provide an accurate microwave heating device based on a time reversal calibration technology, comprising a signal generator and multiple microwave transceivers, and further comprising:

a placement module, for placing a material to be heated into the heating device, wherein the signal generator for emitting the beacon microwave signal is arranged at a placement position of the material to be heated;

a beacon signal emission module, for controlling the signal generator to emit a beacon microwave signal according to the placement position of the material to be heated in the heating device;

a power signal emission module, for controlling the microwave transceivers to emit microwave power signals according to the received beacon microwave signal, wherein the microwave power signals are focused on the placement position for heating the material to be heated in the heating device;

a detection module, for detecting whether a preset trigger condition is satisfied during heating the material to be heated; and a circulation module, for controlling the beacon signal emission module, the power signal emission module and the detection module to cyclically perform when the preset trigger condition is detected to be triggered and a current temperature of the material to be heated does not meet a preset temperature, until the current temperature of the material to be heated meets the preset temperature, and then stopping the signal generator and the microwave transceivers.

According to the present invention, the accurate microwave heating method based on the time reversal calibration technology is provided, wherein: the signal generator is arranged at one position in the heating device; the material to be heated is placed at a position where the signal generator is arranged; after sensing that the material to be heated is placed through a sensor, the signal generator is controlled to emit the beacon microwave signal; the multiple microwave transceivers respectively receive the beacon microwave signal emitted by the signal generator, and respectively emit the microwave power signals according to the received beacon microwave signal emitted by the signal generator; an electromagnetic field formed after synthesizing the microwave power signals corresponding to the multiple microwave transceivers is focused on the placement position for heating the material to be heated; after the temperature of the material to be heated changes during heating, the microwave power signals focused on the material to be heated will be offset from the placement position of the material to be heated; therefore, after satisfying the preset trigger condition through heating, the signal generator is controlled to reemit the beacon microwave signal; according to the reemitted beacon microwave signal, the multiple microwave transceivers respectively reemit the corresponding microwave power signals; the electromagnetic field formed after synthesizing the microwave power signals respectively reemitted by the multiple microwave transceivers is focused on the placement position of the material to be heated again; the above process is repeated, until the current temperature of the material to be heated meets the preset temperature, and then the signal generator and the microwave transceivers are stopped. In the above way, the microwave heating efficiency and the energy utilization rate are effectively improved.

BRIEF DESCRIPTION OF THE DRAWINGS

To illustrate the technical solutions of the present invention more clearly, the accompanying drawings for describing the preferred embodiment of the present invention are simply described as follows. Apparently, the accompanying drawings in the following description are only some embodiments of the present invention, and persons of ordinary skill in the art can derive other drawings from the accompanying drawings without creative efforts.

DETAILED DESCRIPTION OF THE PREFERRED EMBODIMENT

The technical solutions in the preferred embodiment of the present invention will be clearly and completely described with the accompanying drawings as follows. Apparently, the described embodiments are only a part of embodiments of the present invention, not all of the embodiments. Based on the embodiments of the present invention, the other embodiments made by one of ordinary skill in the art without creative efforts are all encompassed in the protection scope of the present invention.

Figure 1:
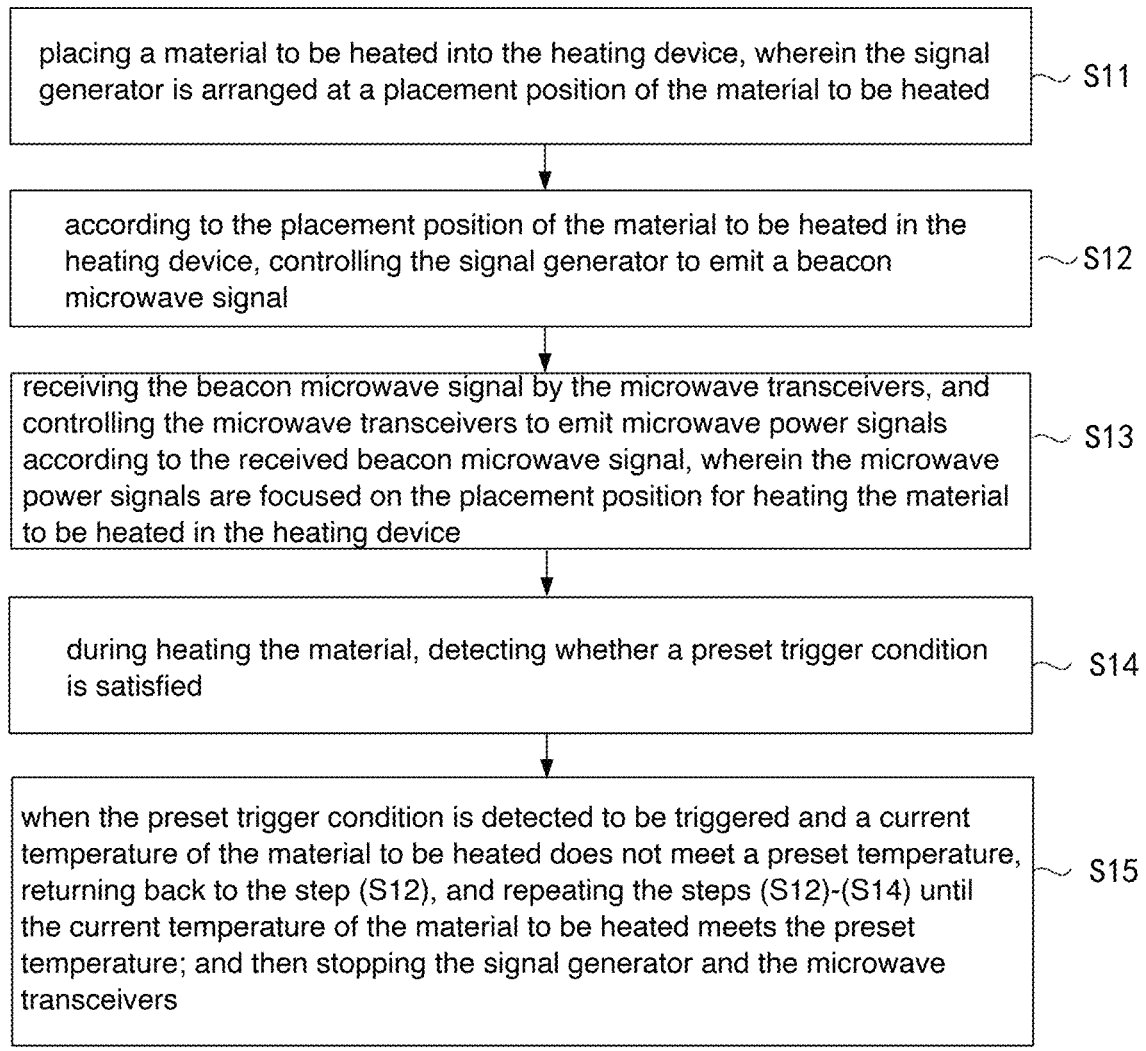
FIG. 1 is a flow chart of an accurate microwave heating method based on a time reversal calibration technology according to a preferred embodiment of the present invention.

In order to solve the problems existing in the prior art, the present invention provides an accurate microwave heating method based on a time reversal calibration technology. FIG. 1 is a flow chart of the accurate microwave heating method based on the time reversal calibration technology according to the preferred embodiment of the present invention. Referring to FIG. 1, the accurate microwave heating method based on the time reversal calibration technology comprises steps of:

(S11) placing a material to be heated into a heating device, wherein: a signal generator is arranged at a placement position of the material to be heated; wherein:

in the preferred embodiment, the signal generator is arranged at a bottom surface of an airtight cavity of the heating device, and the placement position of the material to be heated is above the signal generator;

(S12) according to the placement position of the material to be heated in the heating device, controlling the signal generator to emit a beacon microwave signal; wherein:

in the preferred embodiment, after the material to be heated is detected to be placed into the heating device through a sensor, the signal generator emits the beacon microwave signal;

in the preferred embodiment, as a beacon signal, the beacon microwave signal has a fixed frequency and is not used for heating the material to be heated; therefore, the beacon microwave signal is a time-domine signal with dot frequency and small power;

(S13) receiving the beacon microwave signal by the microwave transceivers, and controlling the microwave transceivers to emit microwave power signals according to the received beacon microwave signal, wherein the microwave power signals are focused on the placement position for heating the material to be heated in the heating device; wherein:

in the preferred embodiment, after receiving the beacon microwave signal, according to a phase and an amplitude of the received beacon microwave signal, the microwave transceivers emit the microwave power signals; the emitted microwave power signals are focused on the placement position of the material to be heated, for heating the material to be heated; because the microwave power signals, which are emitted according to the beacon microwave signal, are effectively focused on the material to be heated, a heating rate and an energy utilization rate of the microwave power signals on the material to be heated become higher;

the microwave power signals emitted by the microwave transceivers are used for heating the material to be heated; therefore, relative to the beacon microwave signal only used as the beacon signal, the microwave power signals have the larger power; the power of the microwave power signals is multiple of the power of the beacon microwave signal, for example the power of the microwave power signals is thousands or tens of thousands of times the power of the beacon microwave signal, and even more;

according to the present invention, the step (S13) specifically comprises steps of:

(S131) according to the phase of the received beacon microwave signal and an initial phase of the beacon microwave signal, determining a first phase of a microwave signal to be emitted; wherein:

in the preferred embodiment, a phase of the beacon microwave signal emitted by the signal generator is the initial phase; when the beacon microwave signal emitted by the signal generator propagates in the heating device, the material to be heated absorbs part of the beacon microwave signal, so that the phase of the beacon microwave signal actually received by the microwave transceivers is a delayed phase of the initial phase of the beacon microwave signal; according to the phase of the beacon microwave signal received by the microwave transceivers and the initial phase of the beacon microwave signal when being emitted, through a phase compensating algorithm, a compensation phase is obtained; through reversing the compensation phase, the first phase of the microwave signal to be emitted by the microwave transceivers is obtained;

it is preferred that the phase compensating algorithm is to reverse a difference between the phase of the beacon microwave signal received by the microwave transceivers and the initial phase of the beacon microwave signal when being emitted, thereby obtaining the first phase of the microwave signal to be emitted by the microwave transceivers; the above-described is only an optional phase compensating algorithm, and the present invention is not limited thereto;

(S132) according to the amplitude of the received beacon microwave signal and an initial amplitude of the beacon microwave signal, determining a first amplitude of the microwave signal to be emitted; wherein:

in the preferred embodiment, an amplitude of the beacon microwave signal emitted by the signal generator is the initial amplitude; when the beacon microwave signal emitted by the signal generator propagates in the heating device, the material to be heated absorbs part of the beacon microwave signal, so that the amplitude of the beacon microwave signal actually received by the microwave transceivers is a reduced amplitude of the initial amplitude of the beacon microwave signal; according to the amplitude of the beacon microwave signal received by the microwave transceivers, through an amplitude compensating algorithm, a compensation amplitude is obtained; according to power required for heating the material to be heated, the compensation amplitude is amplified by a preset ratio, and the first amplitude of the microwave signal to be emitted by the microwave transceivers is obtained;

specifically, because the amplitude of the beacon microwave signal actually received by the microwave transceivers is a reduced amplitude of the initial amplitude of the beacon microwave signal, the amplitude of the beacon microwave signal actually received by the microwave transceivers is normally less than the initial amplitude of the beacon microwave signal; the amplitude of the beacon microwave signal actually received by the microwave transceivers is compared with the initial amplitude of the beacon microwave signal; when the amplitude of the beacon microwave signal actually received by the microwave transceivers is less than the initial amplitude of the beacon microwave signal, according to the amplitude of the beacon microwave signal received by the microwave transceivers, through the amplitude compensating algorithm, the compensation amplitude is obtained; then, according to the power required for heating the material to be heated, the compensation amplitude is amplified by the preset ratio, and the first amplitude of the microwave signal to be emitted by the microwave transceivers is obtained; when the amplitude of the beacon microwave signal actually received by the microwave transceivers is greater than or equal to the initial amplitude of the beacon microwave signal, the amplitude of the beacon microwave signal received by the microwave transceivers is abnormal, and the abnormal condition is alarmed;

the amplitude compensating algorithm is preferred to be:

$$Pr1/P1=Pr2/P2=Pr3/P3=\ldots=Prn/Pn=A;$$

wherein: P1 is power of the beacon microwave signal received by a first microwave transceiver; Pr1 is power of the microwave signal emitted by the first microwave transceiver; Pn is power of the beacon microwave signal received by an $n^{th}$ microwave transceiver; Prn is power of the microwave signal emitted by the $n^{th}$ microwave transceiver; A is a constant preset according to the power required for heating the material to be heated;

(S133) according to the first phase and the first amplitude, controlling the microwave transceivers to emit the microwave power signals, wherein the microwave power signals are focused on the placement position for heating the material to be heated in the heating device; wherein:

in the preferred embodiment, after determining the first phase and the first amplitude through the steps (S131) and (S132), the microwave transceivers emit the microwave power signals with the first phase and the first amplitude; the microwave power signals are namely the microwave signal to be emitted in the above description; the emitted microwave power signals are focused on the placement position of the material to be heated, for heating the material to be heated;

according to the present invention, before executing the step (S13), the method further comprises a step (130) of: after the beacon microwave signal is received by the microwave transceivers, controlling the signal generator to stop emitting the beacon microwave signal;

in the preferred embodiment, the signal generator emits the beacon microwave signal; when the beacon microwave signal is received by the microwave transceivers, the beacon microwave signal has completed its work; according to the received beacon microwave signal, the microwave transceivers emit the microwave power signals, and meanwhile the signal generator is controlled to stop emitting the beacon microwave signal; therefore, in the step (S13), the microwave transceivers receive the beacon microwave signal, and the signal generator is controlled to stop emitting the beacon microwave signal before the microwave transceivers emit the microwave power signals according to the received beacon microwave signal, which are focused on the placement position for heating the material to be heated in the heating device;

(S14) during heating the material, detecting whether a preset trigger condition is satisfied; wherein:

in the preferred embodiment, during heating the material to be heated, whether each index satisfies the preset trigger condition is detected in real time during heating; the steps (S13) and (S14) are executed synchronously; during the whole process of the step (S13) that the microwave transceivers emit the microwave power signals according to the received beacon microwave signal and the emitted microwave power signals are focused on the material to be heated for heating the material to be heated, the step (S14) monitors each index during heating in real time, so as to judge whether each index satisfies the preset trigger condition during heating; after satisfying the preset trigger condition, the step (S15) is executed;

according to the present invention, in the step (S14), the preset trigger condition is determined to be satisfied when: a heating time of the microwave power signals on the material to be heated reaches a time step; or, a temperature rise of the material to be heated is detected to reach a temperature interval;

in the preferred embodiment, indexes monitored in real time in the step (S14) comprise the heating time of the microwave power signals on the material to be heated and the temperature rise of the material to be heated; specifically, the heating time of the microwave power signals on the material to be heated is monitored in real-time; when the heating time of the microwave power signals on the material to be heated reaches the time step, the preset trigger condition is determined to be satisfied; or, the temperature rise of the material to be heated is monitored in real-time; before the microwave power signals heat the material to be heated, a temperature of the material to be heated is measured and serves as an initial temperature of the material to be heated; during the process that the microwave power signals heat the material to be heated, when a current temperature of the material to be heated relative to the initial temperature rises by the temperature interval, the preset trigger condition is determined to be satisfied;

the time step is preferred to be 10S; counting from the microwave transceivers emitting the microwave power signals, when the heating time of the microwave power signals on the material to be heated reaches 10S, the preset trigger condition is determined to be satisfied; meanwhile, the time step can be set to another value according to actual requirements; the temperature interval is preferred to be 5° C.; a temperature change of the material to be heated is detected in real time; the initial temperature of the material to be heated is measured before the microwave power signals heat the material to be heated; during the process that the microwave power signals heat the material to be heated, when the current temperature of the material to be heated relative to the initial temperature rises by 5° C., the preset trigger condition is determined to be satisfied; meanwhile, the temperature interval can be set to another value according to actual requirements;

according to the present invention, after the preset trigger condition is detected to be satisfied, the step (S14) further comprises a step (S140) of: controlling the microwave transceivers to stop emitting the microwave power signals;

in the preferred embodiment, during the process of the step (S13) that the microwave transceivers emit the microwave power signals according to the received beacon microwave signal and the emitted microwave power signals heat the material to be heated, when the preset trigger condition is that the heating time of the microwave power signals on the material to be heated reaches the time step, the heating time of the microwave power signals on the material to be heated is monitored in real time; when the heating time of the microwave power signals on the material to be heated reaches the time step, the preset trigger condition is determined to be satisfied, and the step (S140) is executed for controlling the microwave transceivers to stop emitting the microwave power signals;

when the preset trigger condition is that the current temperature of the material to be heated relative to the initial temperature rises by the temperature interval, the temperature rise of the material to be heated is monitored in real time; the initial temperature of the material to be heated is measured before the microwave power signals heat the material to be heated; during the process that the microwave power signals heat the material to be heated, when the current temperature of the material to be heated relative to the initial temperature rises by the temperature interval, the preset trigger condition is determined to be satisfied, and the step (S140) is executed for controlling the microwave transceivers to stop emitting the microwave power signals;

(S15) when the preset trigger condition is detected to be triggered and the current temperature of the material to be heated does not meet a preset temperature, returning back to the step (S12), and repeating the steps (S12)-(S14) until the current temperature of the material to be heated meets the preset temperature; and then stopping the signal generator and the microwave transceivers; wherein:

in the preferred embodiment, the microwave transceivers emit the microwave power signals for heating the material to be heated; after the temperature of the material to be heated changes, electromagnetic properties inside the material to be heated also change; a focusing position of the microwave power signals emitted by the microwave transceivers will be offset, and the microwave power signals cannot be focused on the placement position of the material to be heated; at this time, the signal generator needs to reemit the beacon microwave signal; according to the reemitted beacon microwave signal, the microwave transceivers reemit the microwave power signals, and the reemitted microwave power signals are focused on the placement position of the material to be heated again, for heating the material to be heated;

specifically, when the heating time of the microwave power signals on the material to be heated is detected to reach the time step or the temperature rise of the material to be heated is detected to reach the temperature interval, the microwave power signals cannot be focused on the placement position of the material to be heated and heat the material to be heated, and the preset trigger condition is triggered at this time; the current temperature of the material to be heated is detected; when the current temperature of the material to be heated does not meet the preset temperature, namely the material to be heated is not heated to the preset temperature, it returns back to the step (S12), and the steps (S12)-(S14) are repeated until the material to be heated is heated to the preset temperature; then the signal generator and the microwave transceivers are stopped;

for each circulation of executing the steps (S12)-(S14), the initial phase and the initial amplitude of the emitted beacon microwave signal in the step (S12) are same; because the electromagnetic properties inside the material to be heated change after the temperature of the material to be heated changes, the delay amount of the initial phase and the reduction amount of the initial amplitude of the received beacon microwave signal in each time of executing the step (S13) are different from that in the last time of executing the step (S13); therefore, each time when executing the step (S13), the phase and the amplitude of the received beacon microwave signal are different; each time when executing the step (S13), according to the received beacon microwave signal in the current circulation, the microwave power signals are emitted, which are focused on the material to be heated and heats the material to be heated;

therefore, multiple circulations are required for repeating the steps (S12)-(S15), so that the material to be heated is heated to the preset temperature; during the above process, in the current circulation of executing the steps (S12)-(S15), when the preset trigger condition is satisfied, the microwave power signals emitted by the microwave transceivers are no longer focused on the placement position of the material to be heated, and the steps (S12)-(S15) need to be executed again; the signal generator reemits the beacon microwave signal, the microwave transceivers reemit the microwave power signals, which are focused on the material to be heated for heating the material to be heated, according to the reemitted beacon microwave signal, until the material to be heated is heated to the preset temperature, then the steps (S12)-(S15) are not repeated, and the signal generator and the microwave transceivers are stopped; in the above way, when the microwave power signals cannot be focused on the placement position of the material to be heated, according to the reemitted beacon microwave signal, the microwave power signals, which are focused on the placement position for heating the material to be heated, are reemitted, until the material to be heated is heated to the preset temperature; therefore, the microwave heating rate and the energy utilization rate are effectively improved;

according to the present invention, during each circulation of executing the steps (S12)-(S15), whether the preset trigger condition is satisfied is detected as follows: the temperature of the material to be heated, which is measured when the last circulation of executing the steps (S12)-(S15) ends, is adopted as the initial temperature of the material to be heated in the current circulation; the temperature rise of the current temperature of the material to be heated relative to the initial temperature of the material to be heated in the current circulation is detected; when the temperature rise reaches the temperature interval, the preset trigger condition is determined to be satisfied in the current circulation; or, the heating time of the microwave power signals emitted in the step (S13) on the material to be heated in the current circulation is detected; when the heating time reaches the time step, the preset trigger condition is determined to be satisfied in the current circulation;

in the present invention, according to the received beacon microwave signal, at least one of the multiple preset microwave transceivers is controlled to emit the microwave power signals;

in the preferred embodiment, there are multiple microwave transceivers for emitting the microwave power signals; because each microwave transceiver is arranged at the different position in the heating device, the beacon microwave signal received by each microwave transceiver is different; according to the received beacon microwave signal, the microwave transceivers respectively emit the microwave power signals; an electromagnetic field formed after synthesizing the microwave power signals emitted by all of the working microwave transceivers is focused on the placement position of the material to be heated and heats the material to be heated; meanwhile, for the multiple microwave transceivers arranged inside the heating device, at least one of the multiple microwave transceivers is controlled to work, so that the electromagnetic field formed after synthesizing the microwave power signals emitted by at least one microwave transceiver is focused on the placement position of the material to be heated and heats the material to be heated;

as an example, the heating device comprises four microwave transceivers, respectively A, B, C and D; when heating the material to be heated, the microwave transceivers A and B are controlled to work, or the microwave transceivers A, B, C and D are controlled to work; according to the actual requirements, the specific microwave transceivers are controlled to emit the microwave power signals to heat the material to be heated.

According to the preferred embodiment of the present invention, the accurate microwave heating method based on the time reversal calibration technology is provided, wherein: the signal generator is arranged at one position in the heating device; the material to be heated is arranged at the position where the signal generator is arranged; after sensing that the material to be heated is placed through a sensor, the signal generator is controlled to emit the beacon microwave signal; the multiple microwave transceivers respectively receive the beacon microwave signal emitted by the signal generator, and respectively emit the microwave power signals according to the received beacon microwave signal emitted by the signal generator; the electromagnetic field formed after synthesizing the microwave power signals corresponding to the multiple microwave transceivers is focused on the placement position of the material to be heated and heats the material to be heated; after the temperature of the material to be heated changes during heating, the microwave power signals focused on the material to be heated will be offset from the placement position of the material to be heated; therefore, after satisfying the preset trigger condition through heating, the signal generator is controlled to reemit the beacon microwave signal; according to the reemitted beacon microwave signal, the multiple microwave transceivers respectively reemit the corresponding microwave power signals; the electromagnetic field formed after synthesizing the microwave power signals respectively reemitted by the multiple microwave transceivers is focused on the placement position of the material to be heated again; the above process is repeated, until the current temperature of the material to be heated meets the preset temperature, and then the signal generator and the microwave transceivers are stopped. In the above way, the microwave heating efficiency and the energy utilization rate are effectively improved.

Figure 2:
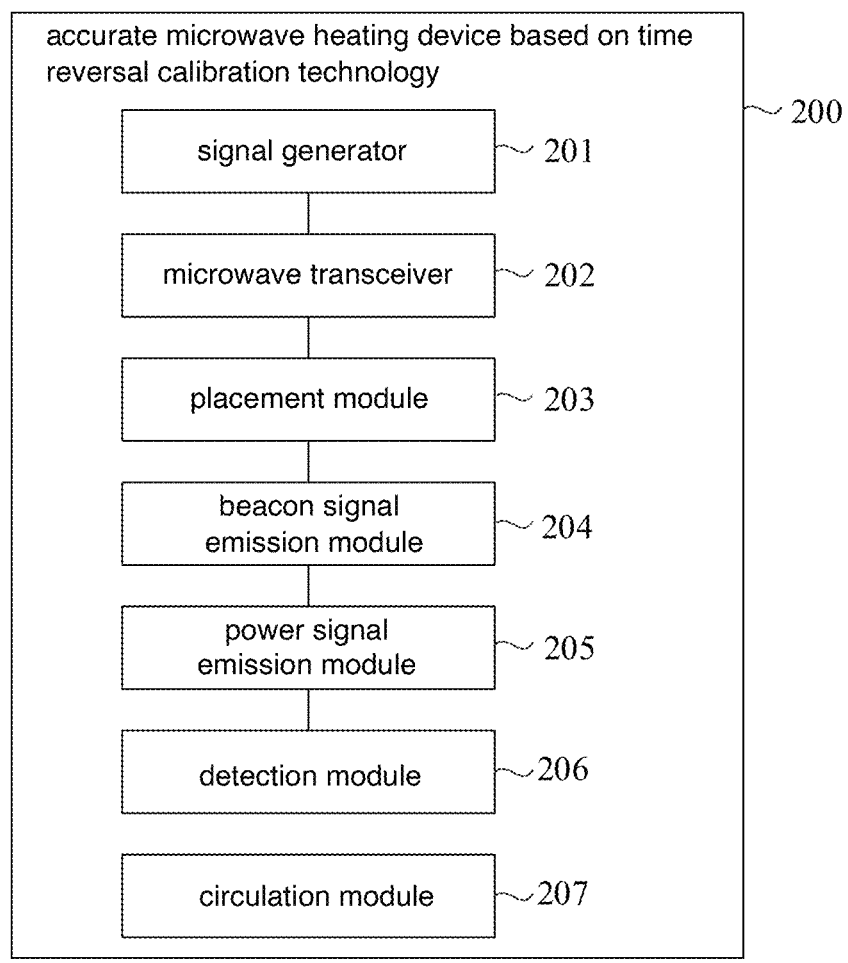
FIG. 2 is a schematic diagram of an accurate microwave heating device based on the time reversal calibration technology according to the preferred embodiment of the present invention.

Based on the same inventive concept, the present invention further provides an accurate microwave heating device 200 based on the time reversal calibration technology. FIG. 2 is a schematic diagram of the accurate microwave heating device based on the time reversal calibration technology according to the preferred embodiment of the present invention. Referring to FIG. 2, the accurate microwave heating device 200 based on the time reversal calibration technology comprises a signal generator 201 and multiple microwave transceivers 202, and further comprises:

- a placement module 203, for placing the material to be heated into the heating device, wherein the signal generator is arranged at the placement position of the material to be heated;
- a beacon signal emission module 204, for controlling the signal generator to emit the beacon microwave signal according to the placement position of the material to be heated in the heating device;
- a power signal emission module 205, for controlling the microwave transceivers to emit the microwave power signals according to the received beacon microwave signal, wherein the microwave power signals are focused on the placement position for heating the material to be heated in the heating device;
- a detection module 206, for detecting whether the preset trigger condition is satisfied during heating the material to be heated; and
- a circulation module 207, for controlling the beacon signal emission module, the power signal emission module and the detection module to cyclically perform when the preset trigger condition is detected to be triggered and the current temperature of the material to be heated does not meet the preset temperature, until the current temperature of the material to be heated meets the preset temperature, and then stopping the signal generator and the microwave transceivers.

Figure 3:
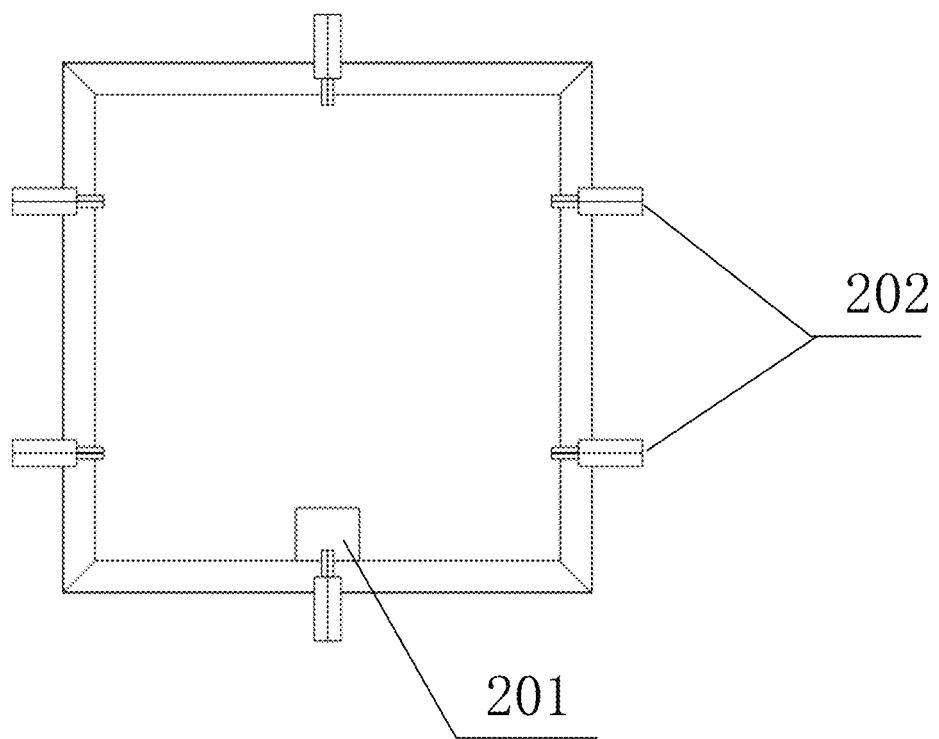
FIG. 3 is a structural diagram of the accurate microwave heating device based on the time reversal calibration technology according to the preferred embodiment of the present invention.

FIG. 3 is a structural diagram of the accurate microwave heating device based on the time reversal calibration technology according to the preferred embodiment of the present invention. Referring to FIG. 3, the signal generator 201 is arranged at the placement position of the material to be heated and at a bottom surface of an airtight cavity of the heating device, for emitting the small-power microwave signal; the multiple microwave transceivers 202 are arranged on the sides of the airtight cavity of the heating device, for emitting the microwave power signals focused on the placement position of the material to be heated.

Figures 4A, 4B:
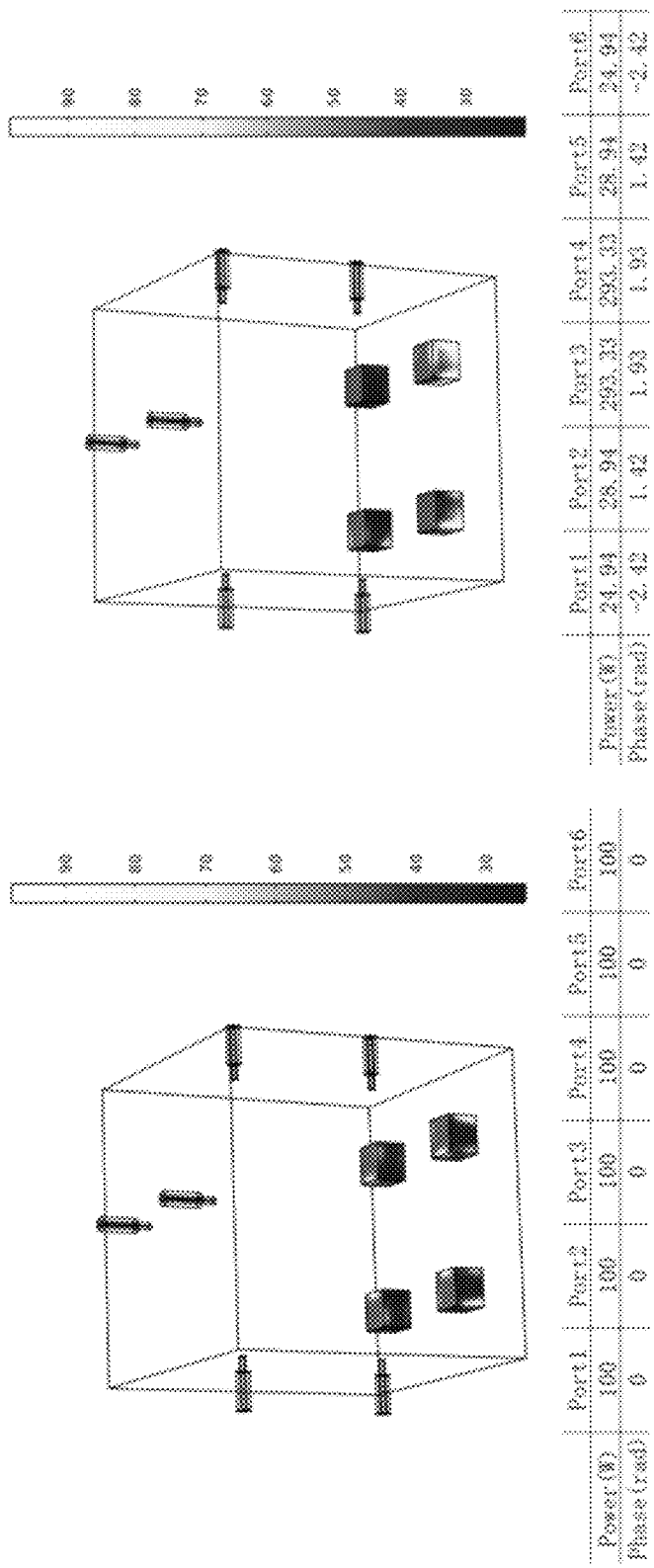
FIG. 4a is a simulated diagram without the accurate microwave heating method based on the time reversal calibration technology according to the preferred embodiment of the present invention.
FIG. 4b is a simulated diagram with the accurate microwave heating method based on the time reversal calibration technology according to the preferred embodiment of the present invention.

FIG. 4a is a simulated diagram without the accurate microwave heating method based on the time reversal calibration technology according to the preferred embodiment of the present invention. FIG. 4b is a simulated diagram with the accurate microwave heating method based on the time reversal calibration technology according to the preferred embodiment of the present invention. Referring to FIG. 4(a) and FIG. 4(b), when the total power is 600 W and the heating time is 2 min, without the accurate microwave heating method based on the time reversal calibration technology, it is obtained through calculation that the average temperature rise of each potato is: $1^{st}$ potato: 18.497° C.; $2^{nd}$ potato: 18.497° C.; $3^{rd}$ potato: 18.497° C.; and $4^{th}$ potato: 18.497° C.; if heating with the accurate microwave heating method based on the time reversal calibration technology, it is obtained that the average temperature rise of each potato is: $1^{st}$ potato: 40.026° C.; $2^{nd}$ potato: 7.228° C.; $3^{rd}$ potato: 10.561° C.; and $4^{th}$ potato: 23.1208° C. Through comparison, it is obtained that: the temperature rise of the $1^{st}$ potato is obvious with the accurate microwave heating method and the energy utilization rate is obviously increased.

Because the heating device is basically similar as the heating method, the heating device is simply described, and the related technical solutions can refer to the description of the heating method in the preferred embodiment.

The embodiments of the present invention are described progressively; each embodiment mainly illustrate the difference from other embodiments; the same or similar part in each embodiment can refer to each other.

Although the preferred embodiment of the present invention is described, once one of ordinary skill in the art knows the basic creative concept, they can make other modifications and changes to the embodiments. Thus, the protection scope of the claims encompasses the preferred embodiment and all of the modifications and changes based on the preferred embodiment.

Finally, it should be noted that: in the present invention, the terms such as "first" and "second" are only for separating one entity or operation from another entity or operation, not for requiring or implying that the relationship or order actually exists among there entities or operations. Moreover, the terms such as "comprise", "include" and any other variations mean non-exclusive inclusion, so that the process, method, material or terminal equipment not only comprises the listed elements, but also comprises other elements not clearly listed or the inherent elements of the process, method, material or terminal equipment. If there is no more limitation, the element limited by the statement "comprises one . . . " does not exclude other same elements existing in the process, method, material or terminal equipment.

The accurate microwave heating method and device based on the time reversal calibration technology provided by the present invention are described above in detail. The principle and the implementation of the present invention are illustrated with the specific examples. The description of the above embodiments is only for helping understand the method and the core concept of the present invention. Meanwhile, for one of ordinary skill in the art, based on the concept of the present invention, modifications can be made to the specific implementation and the application scope. In conclusion, the content of the specification should not be understood as the limitation to the present invention.

What is claimed is:

1. An accurate microwave heating method, which is applied in a heating device having a signal generator and multiple microwave transceivers, comprising steps of:
   - (S11) placing a material to be heated into the heating device, wherein the signal generator is arranged at a placement position of the material to be heated;
   - (S12) according to the placement position of the material to be heated in the heating device, controlling the signal generator to emit a beacon microwave signal;
   - (S13) receiving the beacon microwave signal by the microwave transceivers, and controlling the microwave transceivers to emit microwave power signals according to the received beacon microwave signal, wherein the microwave power signals are focused on the placement position for heating the material to be heated in the heating device;

(S14) during heating the material, detecting whether a preset trigger condition is satisfied; wherein the preset trigger condition is determined to be satisfied when:

a heating time of the microwave power signals on the material to be heated reaches 10 s; or a temperature rise of the material to be heated is detected to reach 5° C.; and (S15) when the preset trigger condition is detected to be triggered and a current temperature of the material to be heated does not meet a preset temperature, returning back to the step (S12), and repeating the steps (S12)-(S14) until the current temperature of the material to be heated meets the preset temperature; and then stopping the signal generator and the microwave transceivers.

2. The method, as recited in claim 1, wherein the step (S13) specifically comprises steps of:

(S131) according to a phase of the received beacon microwave signal and an initial phase of the beacon microwave signal, determining a first phase of a microwave signal to be emitted;

(S132) according to an amplitude of the received beacon microwave signal and an initial amplitude of the beacon microwave signal, determining a first amplitude of the microwave signal to be emitted; and (S133) according to the first phase and the first amplitude, controlling the microwave transceivers to emit the microwave power signals, wherein the microwave power signals are focused on the placement position for heating the material to be heated in the heating device.

3. The method, as recited in claim 1, wherein: after the preset trigger condition is detected to be satisfied, the step (S14) further comprises a step of:

(S140) controlling the microwave transceivers to stop emitting the microwave power signals.

4. The method, as recited in claim 2, wherein: after the preset trigger condition is detected to be satisfied, the step (S14) further comprises a step of:

(S140) controlling the microwave transceivers to stop emitting the microwave power signals.

5. The method, as recited in claim 1, wherein the step of "controlling the microwave transceivers to emit microwave power signals according to the received beacon microwave signal" specifically comprises steps of:

controlling multiple preset microwave transceivers to emit the microwave power signals according to the received beacon microwave signal.

* * * * *